(12) United States Patent
Belzile et al.

(10) Patent No.: US 11,787,550 B1
(45) Date of Patent: Oct. 17, 2023

(54) PROPULSOR ASSEMBLY POWERED BY A DUAL MOTOR SYSTEM

(71) Applicant: BETA AIR, LLC, South Burlington, VT (US)

(72) Inventors: Manon Danielle Belzile, Fairfield, VT (US); David Churchill, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/736,317

(22) Filed: May 4, 2022

(51) Int. Cl.
*B64D 27/24* (2006.01)
*B64D 35/08* (2006.01)
*B64D 45/00* (2006.01)
*B64C 29/00* (2006.01)

(52) U.S. Cl.
CPC ............ *B64D 27/24* (2013.01); *B64D 35/08* (2013.01); *B64C 29/0025* (2013.01); *B64D 2045/0085* (2013.01); *B64D 2221/00* (2013.01)

(58) Field of Classification Search
CPC ............... B64D 27/24; B64D 35/08; B64D 2045/0085; B64D 2221/00; B64C 29/0025
See application file for complete search history.

(56) References Cited

U.S. PATENT DOCUMENTS

| | | | |
|---|---|---|---|
| 4,829,850 A | 5/1989 | Soloy | |
| 10,086,933 B2 * | 10/2018 | Roberts | B64D 27/26 |
| 11,091,258 B2 * | 8/2021 | Groninga | B64C 29/0025 |
| 2019/0300193 A1 | 10/2019 | Riedel | |
| 2019/0375495 A1 | 12/2019 | Pfammatter et al. | |
| 2020/0227988 A1 | 7/2020 | Zhu et al. | |
| 2020/0361622 A1 | 11/2020 | Groninga et al. | |
| 2021/0119499 A1 | 4/2021 | Lehikoinen et al. | |
| 2021/0179262 A1 | 6/2021 | Venter et al. | |
| 2021/0276706 A1 * | 9/2021 | Heironimus | B64D 27/24 |

FOREIGN PATENT DOCUMENTS

| | | | | |
|---|---|---|---|---|
| CN | 205554579 U | 9/2016 | | |
| DE | 102018107586 A1 * | 10/2019 | | B60L 53/16 |
| EP | E P-3826147 A1 * | 5/2021 | | H02K 3/28 |
| JP | 2010202004 A * | 9/2010 | | B60K 6/365 |
| WO | WO-2013145102 A1 * | 10/2013 | | B60K 6/365 |

OTHER PUBLICATIONS

Nicolas Zart, E-plane VoltAero tests new Safran electric motors. Mar. 12, 2020.
Daniel Bachmann, This New 8-Seat Electric Airplane Costs 80% Less to Fly Than Conventional Aircraft, Apr. 25, 2021.

* cited by examiner

*Primary Examiner* — Valentina Xavier
(74) *Attorney, Agent, or Firm* — Caldwell Intellectual Property Law, LLC

(57) ABSTRACT

In an aspect this disclosure is directed at a propulsor assembly powered by a dual motor system. The aircraft may comprise a propulsors. The electric aircraft may also include a driveshaft that is mechanically coupled to the propulsor, wherein a driveshaft is configured to provide mechanical power to the propulsor. The aircraft includes a plurality of electric motors. The electric motors may be configured to impart rotational energy to the driveshaft. Wherein each electric motor includes a stator and a rotor. Each electric motor is selectively engaged to the driveshaft by a freewheel clutch.

20 Claims, 7 Drawing Sheets

PROPULSOR ASSEMBLY POWERED BY A DUAL MOTOR SYSTEM

FIELD OF THE INVENTION

The present invention generally relates to the field of electric aircrafts. In particular, the present invention is directed to a propulsor assembly powered by a dual motor system.

BACKGROUND

In vertical takeoff and landing aircrafts, the engine assembly are often housed outside of the boom. This means that the engine assembly is often exposed to the elements and are more susceptible to damage. Design of the engine assembly must be done in a manner to mitigate these issues. Existing approaches to the problem are limited.

SUMMARY OF THE DISCLOSURE

In an aspect this disclosure is directed at a propulsor assembly powered by a dual motor system. The aircraft may comprise a propulsors. The electric aircraft may also include a driveshaft that is mechanically coupled to the propulsor, wherein a driveshaft is configured to provide mechanical power to the propulsor. The aircraft includes a plurality of electric motors. The electric motors may be configured to impart rotational energy to the driveshaft. Wherein each electric motor includes a stator and a rotor. Each electric motor is selectively engaged to the driveshaft by a freewheel clutch.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a propulsor assembly powered by a dual motor system. In an embodiment, the electric aircraft includes of a propulsors. Additionally, the aircraft includes a driveshaft that is mechanically coupled to the propulsor. The aircraft includes a plurality of electric motors. The electric motors may be configured to impart rotational energy to the driveshaft. Wherein each electric motor includes a stator and a rotor. Each electric motor is selectively engaged to the driveshaft by a freewheel clutch. Aspects of the present disclosure can be used to aid the aircraft in rotor based flight . Aspects of the present disclosure can also be used to aid the aircraft while engaged in the takeoff and landing process.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
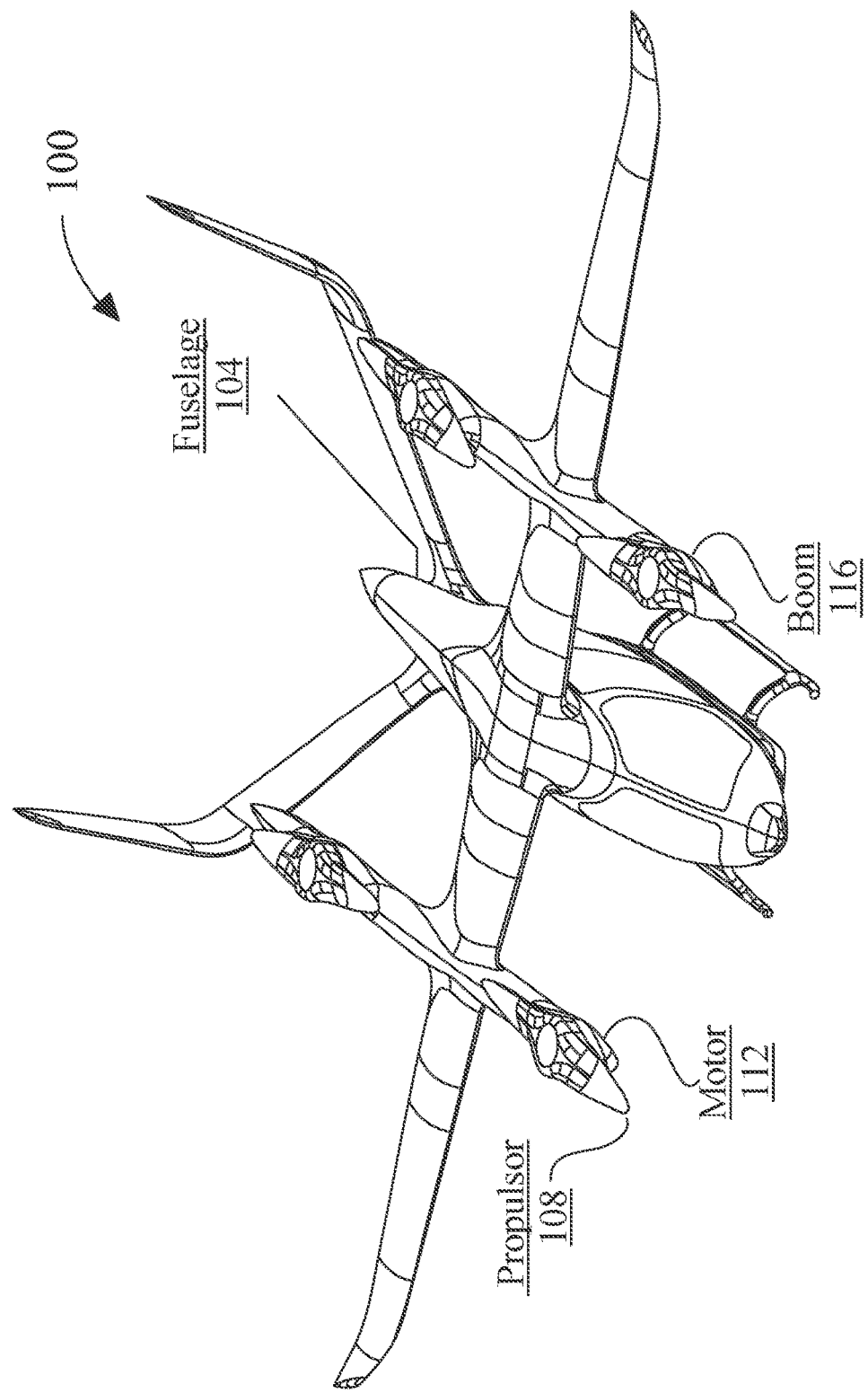
FIG. 1 is an exemplary embodiment of an electric aircraft.

Referring now to the drawings, FIG. 1 illustrates an exemplary embodiment of a vertical takeoff and landing aircraft 100. Aircraft 100 includes a fuselage 104, boom 116, and Propulsor 108. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction," vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers, and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch (lbf/in2) or Pascals (Pa). In semi-monocoque construction stressed skin may bear part of aerodynamic loads and additionally may impart force on an underlying structure of stringers and formers.

In an embodiment, and still referring to FIG. 1, a fixed wing may be mechanically attached to fuselage 104. Fixed wings may be structures which include airfoils configured to create a pressure differential resulting in lift. Fixed wings may generally dispose on the left and right sides of the aircraft symmetrically, at a point between nose and empennage. Fixed wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Boom 116 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Boom may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1 Aircraft 100 comprises an electric vertical takeoff and landing aircraft. As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate lift caused by the aircraft's forward airspeed and the shape of the wings and/or foils, such as airplane-style flight. Boom 116 is located on aircraft 100, attached and adjacent to the fuselage 104. As used in this disclosure, a "boom" is an element that projects essentially horizontally from fuselage, including a laterally extending element, an outrigger, a spar, a lifting body, and/or a fixed wing that extends from fuselage 104. For the purposes of this disclosure, a "lifting body" is a structure that creates lift using aerodynamics. Boom 116 may extend perpendicularly to the fuselage 104. Aircraft 100 comprises at least one motor assembly and at least one boom to house said motor assembly. Motor assembly may be comprised of an electric, gas, etc. motor. Motor is driven by electric power wherein power have varying or reversing voltage levels. For example, motor may be driven by alternating current (AC) wherein power is produced by an alternating current generator or inverter. A propulsor may be attached to a motor assembly. Propulsor 108 is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 1, propulsor 108 may include a propeller, a blade, or any combination of the two. A propeller may function to convert rotary motion from an engine or other power source into a swirling slipstream which may push the propeller forwards or backwards. Propulsor 108 may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor 108 may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 1, Aircraft 100 may be included of a driveshaft that is mechanically coupled to the propulsor 108. As used in the current disclosure, a "driveshaft" is a component for transmitting mechanical power, torque, and rotation. In an embodiment, a driveshaft maybe configured to is to couple to the motor that produces the power to the propulsor that uses this mechanical power to rotate the propellors. This connection involves mechanically linking the two components. In a nonlimiting example, the driveshaft may be used to transfer torque between components that are separated by a distance, since different components must be in different locations in the aircraft. To allow for variations in the alignment and distance between the propulsor and the motor 112, driveshafts frequently incorporate one or more universal joints, jaw couplings, or rag joints, and sometimes a splined joint or prismatic joint.

Additional disclosure related to an electric motor or a propulsor can be found in U.S. patent application Ser. No. 17/564,404, filed on Dec. 29, 2021, and entitled "SYSTEM FOR A VERTICAL TAKEOFF AND LANDING AIRCRAFT WITH AN IN-BOOM LIFT PROPULSOR," the entirety of which is incorporated herein by reference.

Still in referring to FIG. 1, aircraft 100 includes a plurality of electric motor 112. In some embodiments, system may include two of electric motors 112; for example, first electric motor and second electric motor in FIG. 1. In some embodiments, system may include more than two of electric motor 112. For the purposes of this disclosure, an "electric motor," is a machine that converts electrical energy into mechanical energy. Each electric motor 112 in system 100 includes a stator and at least an inverter. The plurality of electric motors 112 are discussed in more detail below in FIGS. 2 and 3.

With continued reference to FIG. 1, Aircraft 100 may include a motor nacelle. Motor nacelle surrounds the at least an electric motor. In an embodiment, as in FIG. 1, motor nacelle may surround first electric motor 112 and second electric motor 112. For the purposes of this disclosure, "motor nacelle" refers to a streamlined enclosure that houses an aircraft motor. In some embodiments, motor nacelle may be located on the wing or boom of an aircraft. In some other embodiments, motor nacelle may be part of an aircraft tail cone. A "tail cone," for the purposes of this disclosure, refers to the conical section at the tail end of an aircraft.

Still referring to FIG. 1, propulsor 108 may include any such components and related devices as disclosed in U.S. Nonprovisional application Ser. No. 16/427,298, filed on May 30, 2019, entitled "SELECTIVELY DEPLOYABLE HEATED PROPULSOR SYSTEM," U.S. Nonprovisional application Ser. No. 16/703,225, filed on Dec. 4, 2019, entitled "AN INTEGRATED ELECTRIC PROPULSION ASSEMBLY," U.S. Nonprovisional application Ser. No. 16/910,255, filed on Jun. 24, 2020, entitled "AN INTEGRATED ELECTRIC PROPULSION ASSEMBLY," U.S. Nonprovisional application Ser. No. 17/319,155, filed on May 13, 2021, entitled "AIRCRAFT HAVING REVERSE THRUST CAPABILITIES," U.S. Nonprovisional application Ser. No. 16/929,206, filed on Jul. 15, 2020, entitled "A HOVER AND THRUST CONTROL ASSEMBLY FOR DUAL-MODE AIRCRAFT," U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," U.S. Nonprovisional application Ser. No. 17/321,662, filed on May 17, 2021, entitled "AIRCRAFT FOR FIXED PITCH LIFT," and U.S. patent application Ser. No. 17/564,404, filed on Dec. 29, 2021 and entitled "SYSTEM FOR A VERTICAL TAKEOFF AND LANDING AIRCRAFT WITH AN IN-BOOM LIFT PROPULSOR," the entirety of each one of which is incorporated herein by reference. Any aircrafts, including electric and eVTOL aircrafts, as disclosed in any of these applications may efficaciously be utilized with any of the embodiments as disclosed herein, as needed, or desired. Any flight controllers as disclosed in any of these applications may efficaciously be utilized with any of the embodiments as disclosed herein, as needed, or desired.

Figure 2:
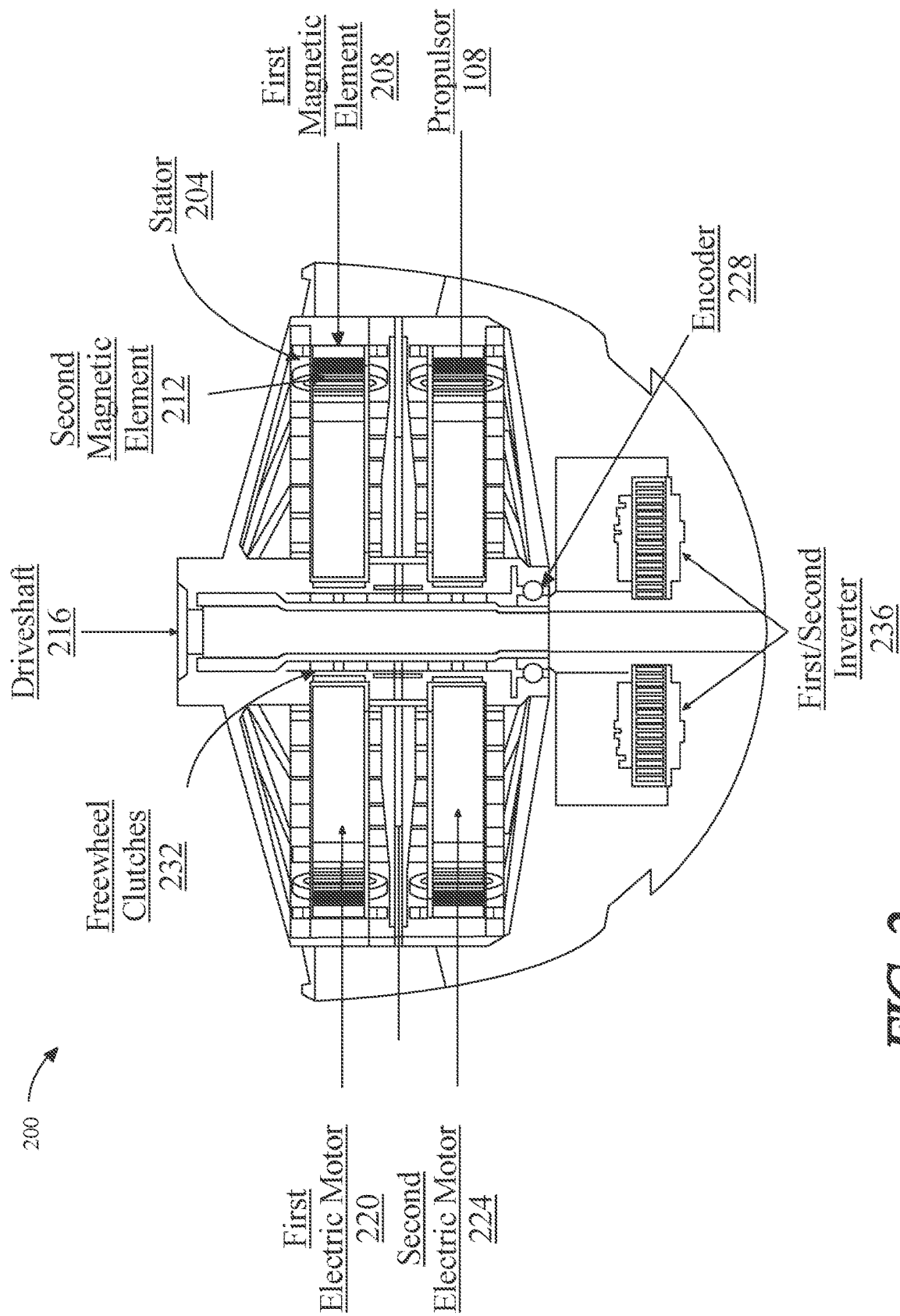
FIG. 2 is a diagram of the cross-sectional view of the motor assembly.

Referring now to FIG. 2, a cross sectional view of an exemplary embodiment of a motor assembly 200. Motor assembly 200 includes at least a stator 204. Stator 204, as used herein, is a stationary component of a motor and/or motor assembly. In an embodiment, stator 204 includes at least a first magnetic element 208. As used herein, first magnetic element 208 is an element that generates a magnetic field. For example, first magnetic element 208 may include one or more magnets which may be assembled in rows along a structural casing component. Further, first magnetic element 208 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 208 may act to produce or generate a magnetic field to cause other magnetic elements to rotate, as described in further detail below. Stator 204 may include a frame to house components including at least a first magnetic element 208, as well as one or more other elements or components as described in further detail below. In an embodiment, a magnetic field can be generated by a first magnetic element 208 and can comprise a variable magnetic field. In embodiments, a variable magnetic field may be achieved by use of an inverter, a controller, or the like. In an embodiment, stator 204 comprises an inner and outer cylindrical surface; a plurality of magnetic poles may extend outward from the outer cylindrical surface of the stator. Inner cylindrical surface and outer cylindrical surface are coaxial about an axis of rotation. The stator is explained with further detail in FIG. 3. In an embodiment, stator 204 may include an annular stator, wherein the stator is ring-shaped. In an embodiment, stator 204 may be incorporated into a DC motor where stator 204 is fixed and functions to supply the magnetic fields where a corresponding rotor 316, as described in further detail below, rotates.

Still referring to FIG. 2, Propulsor 108 can include an integrated rotor. As used herein, a rotor is a portion of an electric motor that rotates with respect to a stator of the electric motor, such as stator 204. A propulsor, as used herein, is a component or device used to propel a craft by exerting force on a fluid medium, which may include a gaseous medium such as air or a liquid medium such as water. Propulsor 108 may be any device or component that consumes electrical power on demand to propel an aircraft or other vehicle while on ground and/or in flight. Propulsor 108 may include one or more propulsive devices. In an embodiment, propulsor 108 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 108 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 108. In an embodiment, when a propulsor twists and pulls air behind it, it will, at the same time, push the aircraft forward with an equal amount of force. The more air pulled behind the aircraft, the more the aircraft is pushed forward.

Continuing to refer to FIG. 2, propulsor 108 can include a hub rotatably mounted to stator 204. Rotatably mounted, as described herein, is functionally secured in a manner to allow rotation. Hub is a structure which allows for the mechanically coupling of components of the integrated rotor assembly. In an embodiment, hub can be mechanically coupled to propellers or blades. In an embodiment, hub may be cylindrical in shape such that it may be mechanically joined to other components of the rotor assembly. Hub may be constructed of any suitable material or combination of materials, including without limitation metal such as aluminum, titanium, steel, or the like, polymer materials or composites, fiberglass, carbon fiber, wood, or any other suitable material. Hub may move in a rotational manner driven by interaction between stator 204 and components in the rotor assembly. Persons skilled in the art, upon reviewing the entirety of this disclosure, will be aware of various structures that may be used as or included as hub, as used and described herein.

Still referring to FIG. 2, propulsor 108 comprises a second magnetic element 212, which may include one or more further magnetic elements. Second magnetic element 212 generates a magnetic field designed to interact with first magnetic element 208. Second magnetic element 212 may be designed with a material such that the magnetic poles of at least a second magnetic element are oriented in an opposite direction from first magnetic element 208. In an embodiment, second magnetic element 212 may be affixed to hub. Affixed, as described herein, is the attachment, fastening, connection, and the like, of one component to another component. For example and without limitation, affixed may include bonding the second magnetic element 212 to hub, such as through hardware assembly, spot welding, riveting, brazing, soldering, glue, and the like. Second magnetic element 212 may include any magnetic element suitable for use as a first magnetic element 208. For instance, and without limitation, second magnetic element may include a permanent magnet and/or an electromagnet. Second magnetic element 212 may include magnetic poles oriented in a second direction opposite of the orientation of the poles of first magnetic element 208. In an embodiment, motor assembly 200 incorporates stator 204 with a first magnet element and second magnetic element 212. First magnetic element 208 includes magnetic poles oriented in a first direction, a second magnetic element includes a plurality of magnetic poles oriented in the opposite direction than the plurality of magnetic poles in the first magnetic element 208.

Continuing to refer to FIG. 2, second magnetic element 212 may include a plurality of magnets attached to or integrated in hub. In an embodiment, hub may incorporate structural elements of the rotor assembly of the motor assembly. As a non-limiting example hub may include a motor inner magnet carrier and motor outer magnet carrier incorporated into the hub structure. In an embodiment motor inner magnet carrier and motor outer magnet carrier may be cylindrical in shape. In an embodiment, motor inner magnet carrier and motor out magnet carrier may be any shape that would allow for a fit with the other components of the rotor assembly. In an embodiment, hub may be short and wide in shape to reduce the profile height of the rotating assembly of motor assembly 200. Reducing the profile assembly height may have the advantage of reducing drag force on the external components. In an embodiment, hub may also be cylindrical in shape so that fitment of the components in the rotor assembly are structurally rigid while leaving hub free to rotate about stator 204.

Still referring to FIG. 2, motor assembly 200 may include a rotating assembly and a stationary assembly. Hub, motor inner magnet carrier and Driveshaft 216 may be incorporated into the rotor assembly of motor assembly 200 which make up rotating parts of electric motor, moving between the stator poles and transmitting the motor power. As one integrated part, the rotor assembly may be inserted and removed in one piece. Stator 204 may be incorporated into the stationary part of the motor assembly 200. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example and without limitation, a first magnetic element 208 in motor assembly 200 may include an active magnet. For instance and without limitation, a second magnetic element may include a passive magnet, a magnet that reacts to a magnetic force generated by a first magnetic element 208. In an embodiment, a first magnet and a second magnet, positioned around the rotor assembly, may generate magnetic fields to affect the position of the rotor relative to the stator. A controller may have an ability to adjust electricity originating from a power supply and, thereby, the magnetic forces generated, to ensure stable rotation of the rotor, independent of the forces induced by the machinery process. Motor assembly 200 may include an impeller coupled with the driveshaft 216. An impeller, as described herein, is a rotor used to increase or decrease the pressure and flow of a fluid and/or air. Impeller may function to provide cooling to motor assembly 200. Impeller may include varying blade configurations, such as radial blades, non-radial blades, semi-circular blades, and airfoil blades. Impeller may further include single and/or double-sided configurations. Additional disclosure related to motor assemblies and electric propulsion assemblies can be found in U.S. patent application Ser. No. 16/910,255, filed on Jun. 24, 2021, and entitled "INTEGRATED ELECTRIC PROPULSION ASSEMBLY," the entirety of which is incorporated herein by reference.

Still referring to FIG. 2, motor assembly 200 may include dual motor assembly. As used in the current disclosure, "Dual motor assembly" is a first motor 220 and a second motor 224 which are both located within the same motor assembly. The dual motor assembly is a redundancy configured to safe guard from potential failure of the first motor.

Still referring to FIG. 2, motor assembly 200 may include an encoder 228. As used in the current disclosure, an "encoder" is an electro-mechanical device that converts the angular position or motion of a driveshaft to analog or digital output signal. There are two main types of rotary encoders 228 absolute and incremental. For example, the output of an absolute encoder 228 indicates the current shaft position, making it an angle transducer. For example, the output of an incremental encoder 228 provides information about the motion of the shaft, which typically is processed elsewhere into information such as position, speed, and distance. Encoders 228 may be used in applications that require monitoring or control, or both, of mechanical systems. In an embodiment, encoder 228 may be an optical encoder. An optical encoder is a type of motion sensing device that uses light shone through a coded disk to track the movement of a shaft. Optical encoder may produce an electrical signal output proportional to the linear displacement of a linear guide or the angular position of an driveshaft . An optical encoder's disc may be made of material such as metal, glass, ceramic, or plastic with transparent and opaque areas. In embodiments, a light source and photo detector array may read an optical pattern that results from the disc's position at any one time as a result of light transmission through one or more transparent windows in the disc. In another embodiment, encoder 228, may include a Hall effect encoder. A Hall effect encoder may include an incremental or absolute rotary encoder that uses contactless magnetic sensing to detect rotational speed and direction of driveshaft. Hall effect encoders may use magnetic phased arrays that contain hall sensor elements arranged in a pattern to match position of a magnet, which may be mechanically coupled to a device whose angular position, displacement, and/or velocity is to be measured. A signal may be produced as the sensor passes over the magnetic field which may be interpolated to a desired resolution and encoded using digital encoding, pulse width modulated encoding, or the like.

Additional disclosure related to the rotors or an electric aircraft can be found in U.S. patent application Ser. No. 17/704,798, filed on Mar. 25, 2022, 2022, and entitled "ROTOR FOR AN ELECTRIC AIRCRAFT MOTOR," the entirety of which is incorporated herein by reference.

Additional disclosure related to motor windings can be found in U.S. patent application Ser. No. 17/154,578, filed on Jan. 1, 2021, and entitled "METHODS AND SYSTEMS FOR A STATOR WITH HELICAL WINDINGS CONFIGURED FOR USE IN ELECTRIC AIRCRAFT MOTOR," the entirety of which is incorporated herein by reference.

Still in referring to FIG. 2, aircraft 100 may include driveshaft 216 connected to the Dual motor assembly 220/224 using a freewheel clutch 232. As used in the current disclosure, a "freewheel clutch" that disengages the driveshaft from the driven shaft when the driven shaft rotates faster than the driveshaft. In an embodiment, the simplest freewheel clutch 232 consists of a plurality saw-toothed, spring-loaded discs pressing against each other with the toothed sides together, somewhat like a ratchet. Rotating in one direction, the saw teeth of the drive disc lock with the teeth of the driven disc, making it rotate at the same speed. If the drive disc slows down or stops rotating, the teeth of the driven disc slip over the drive disc teeth and continue rotating. In other embodiments A more sophisticated and rugged design has spring-loaded steel rollers inside a driven cylinder. Rotating in one direction, the rollers lock with the cylinder making it rotate in unison. Rotating slower, or in the opposite direction, the steel rollers just slip inside the cylinder. In other embodiments, in rotorcraft such as aircraft 100, a rotorcraft's blades must be able to spin faster than its drive engines. For example, this is especially important in the event of an engine failure where a freewheel in the main transmission lets the first electric motor 220 and second electric motor 228 continue to spin independent of the drive system. This provides for continued flight control and an autorotation landing.

Still in referring to FIG. 2 a freewheel clutch 232 may be comprised of a sprag clutch. As used in the current disclosure, " sprag clutch" is a freewheel clutch that allows the clutch to spin in only one direction. A sprag clutch employs, non-revolving asymmetric figure-eight shaped sprags, or other elements allowing single direction rotation, are used. For example. when the unit rotates in one direction the rollers slip or free-wheel, but when a torque is applied in the opposite direction, the sprags tilt slightly, producing a wedging action and binding because of friction.

With continued reference to FIG. 2, motor assembly 200 may include an inverter 236. As used in the current disclosure, an "inverter," for the purposes of this disclosure, is a frequency converter that converts DC power into AC power. Specifically, first inverter and/or second inverter may supply AC power to drive first electric motor 220 and/or second electric motor 224. First inverter and/or second inverter may be entirely electronic or a combination of mechanical elements and electronic circuitry. First inverter and/or second inverter may allow for variable speed and torque of the motor based on the demands of the vehicle. In some embodiments, inverter 236 may be electrically connected to each stator 204. "Electrically connected," for the purposes of this disclosure, means connected such that electricity may flow between the connected components, for instance and without limitation so as to enable an inverter to drive a motor by varying a current through one or more stator windings. In some cases, components may be electrically connected, even when electricity must flow through an intermediary component in between the electrically connected components. First inverter and/or second inverter 124 may be consistent with any inverter disclosed in in U.S. patent application Ser. No. 16/703,225, filed on Dec. 4, 2019, and titled "AN INTEGRATED ELECTRIC PROPULSION ASSEMBLY." First inverter and/or second inverter may be consistent with any inverter disclosed in disclosed in U.S. patent application Ser. No. 16/938,952, filed on Jul. 25, 2020, and titled "AN INTEGRATED ELECTRIC PROPULSION ASSEMBLY," the entirety of which is hereby incorporated by reference.

With continued reference to FIG. 2, Motor assembly 200 may generate a required torque/speed of 2050 Nm/1300 RPM. Stator 204 may reach a temperature of 160 degrees Celsius. Rotor may reach a temperature of 120 degrees Celsius. The stater slot/pole number may be 48/40. The windings may be configured to be a 2×3 phase Y-connection. There may be 12 turns in the winding. The magnet grade may be N48UH. The steel used may be a DiMax-HF10. The Magnet/Back-iron length 57 mm. The copper winding may have a fill factor of 0.85 modelled area. (slot liners already excluded.) The end winding factor may be 1.625, an addition 35 mm per turn. The combined Active mass of the steel, magnets, and copper is 26-27 kg. The winding may contain an additional AC factor loss of 1.1. (multi-strand wires) Winding may have a resistance per phase of 44 mOhm at 20 degrees Celsius and 67 mOhm at 160 degrees Celsius. The inductance may be 180 uH at 240 Arms. The current may be 240 Arms (RMS OEI) and 115 Arms (Nominal).'

With continued reference to FIG. 2, there may be key system impacts of Lift EPU system. Assuming that all weight savings will be added to battery weight and battery energy density is 200 Wh/kG, L/D=15.4, and average lift operating time 5 minute per flight. Lift EPU weight impacts aircraft range at the rate of 0.122 nmi/kg. Lift EPU losses affect aircraft weight at the rate of 1500 W/kG. Total Lift EPU efficiency is expected to be 94.1% normal and 90% in OMI operation this is 94.5%-90.4% motor and 99.6% for inverter). DC voltage is critical to optimization of the EPU systems.

Figure 3:
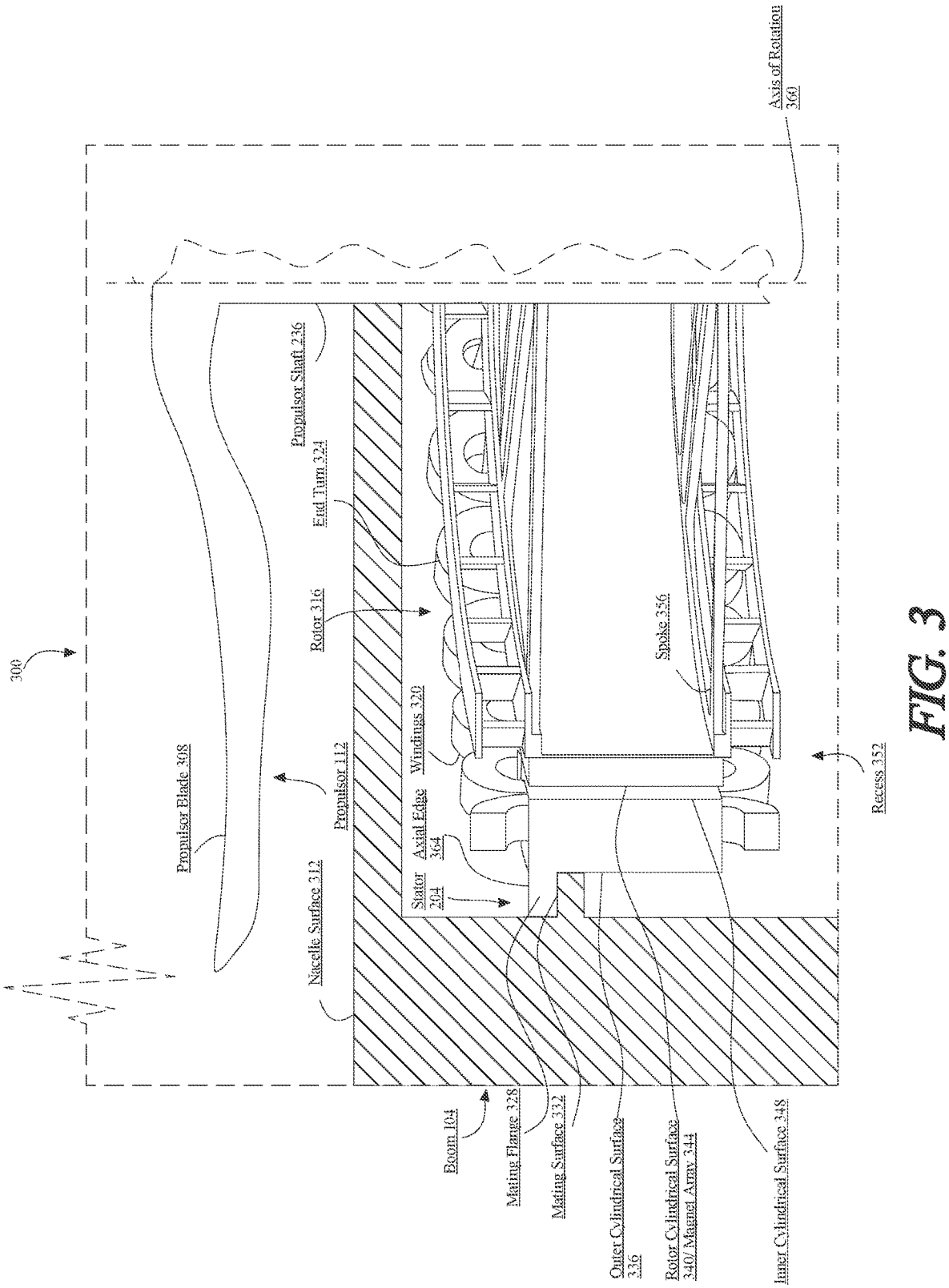
FIG. 3 is a diagram of the cross-sectional view of the boom and motor assembly.

Referring now to FIG. 3, a diagram 300 a detailed cross-sectional view of a motor assembly 200 in a boom 116. Boom 116 contains a recess 352 on the upper surface of the boom. For example and without limitation, a recess may be radially symmetrical; for instance, part or all of the recess may be substantially cylindrical. As a further nonlimiting example, a recess may closely match the shape of the motor, or other object, within. In an embodiment, a recess may include an open, fully covered, and/or partially covered cavity that houses a motor and/or stator. Recess 352 may include a lip that could be used as a mating surface 332. Recess 352 may include one or more mating surfaces. Mating surface 332 is configured on the recess 352 in boom 116 to contact the mating flange 328. Motor assembly 200 contains a mating flange 328 on stator 204. Mating flange 328 is weld to the boom 116 such that the stator is affixed to aircraft 100. Mating flange 328 can be weld to the boom 116 using standard welding practices such as Arc, MIG (metal, inert gas), TIG (Tungsten Inert Gas), or the like. Mating flange 328 can be fixed to the boom 116 using mechanical methods such as using bolts, rivets, adhesives, and the like. Mating flange 328 may be a structural channel that is configured to resist a moment along an axis of the propulsor shaft. "Moment," as used in this disclosure, is a measure of rotational effort about an axis. Moments may be used to describe rotational efforts acting on static components. In this instance, the mating flange 328 is configured such it resists movement from side to side of a propeller. Mating flange 328 is attached to mating surface 332 using methods mentioned above.

Continuing to refer to FIG. 3, boom 116 includes a nacelle surface 312. As used herein, a "nacelle surface" refers to an aerodynamically formed surface. Motor assembly 300 may be housed within the nacelle surface 312 on the boom 116. The surface may redirect downdrafts as well as updrafts or any other passage of air around or at the boom 116 from a Propulsor 108. "Aerodynamic," for the purposes of this disclosure, includes a design for a nacelle that reduces drag and wind resistance as a function of what is housed within. Nacelle surface 312 and boom 116 comprises the same material as the fuselage 104 of the aircraft. Material may be any material suitable for formation of a structural element. Boom 116 may include an opening through which a shaft supporting a rotor 316 and/or portion of a propulsor may pass.

Continuing to refer to FIG. 3, stator 204 includes an inner cylindrical surface 348 and an outer cylindrical surface 336 each coaxial about an axis of rotation 360 and at least partially defined by an axial edge 364 on either side. Stator 204 may comprise stacked laminations, also known as punchings, with inner teeth. An outer surface of the stacked laminations may form outer cylindrical surface 336. Inner cylindrical surface 348 and outer cylindrical surface 336 may share a coincident and parallel centerline disposed at the center of each cylindrical surface. Inner cylindrical surface 348 and outer cylindrical surface 336 may include different radii and thus include different sizes. Stator 204 may include windings 320 made of electrically conductive coil wound around a magnetic core, which may include without limitation an iron core or other magnetic material. Specifically, windings 320 may be wound around the inner teeth of the stacked laminations. Coil may include any material that is conductive to electrical current and may include, as a non-limiting example, various metals such as copper, steel, or aluminum, carbon conducting materials, or any other suitable conductive material. Each of windings 320 may form an oval shape with an end turn 324 on either end of windings 320. End turn 324 may extend past at least an axial edge 364 of stator 204. Each end turn 324 may extend past the corresponding at least an axial edge 364 such that a portion of an interior space of each of windings 320 at least partially extends past both at least an axial edge 364. Stator 204 may include one or more magnets which may be assembled in rows along a structural casing component. Further, stator 204 may include one or more magnets having magnetic poles oriented in at least a first direction. The magnets may include any of the examples discussed above in FIG. 2.

Still referring to FIG. 3, motor 200 includes a rotor 316 coaxial within stator 204. A rotor 316 is a portion of an electric motor that rotates with respect to a stator 204 of the electric motor, such as stator 204. Rotor 316 includes a rotor cylindrical surface 340, wherein the rotor cylindrical surface 340 and inner cylindrical surface 348 of stator 204 combine to form an air gap 164 between the rotor cylindrical surface 340 and the inner cylindrical surface 348. Rotor cylindrical surface 340 may be disposed opposite and opposing to inner cylindrical surface 348 of stator 204. Rotor 316 may include a Driveshaft 216. Driveshaft 216 may be disposed coaxially and coincidentally within stator 204. Driveshaft 216 may be rotatable relative to stator 204, which remains stationary relative to electric aircraft 108. Rotor cylindrical surface 340 may be radially spaced from Driveshaft 216 such as, for example, in a squirrel cage rotor assembly. At least a spoke 356 may extend from Driveshaft 216 to one or both of axial edge 364 of rotor cylindrical surface 340. At least a spoke 356 may include a plurality of spokes on each of axial edge 364 of rotor cylindrical surface 340. Rotor 316 may include a plurality of permanent magnets, namely a magnet array 344, disposed radially about the axis of rotation 360 of Driveshaft 216 which may be parallel and coincident with axis of rotation 360 of motor 200. Magnet array 344 may be positioned on rotor cylindrical surface 340 and radially from Driveshaft 216, such that rotor cylindrical surface 340 is between magnet array 344 and Driveshaft 216. Magnet array 344 may be opposite inner cylindrical surface 348 of stator 204 and spaced from the inner cylindrical surface 348 by air gap 164. Rotor cylindrical surface 340 may comprise magnet array 344. Magnet array 344 may include a Halbach array. A Halbach array is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the Driveshaft 216, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable. Magnet array 344 may comprise a magnet sleeve forming at least part of rotor cylindrical surface 340 with slits and/or ribs in the magnet sleeve to further dissipate heat. Slits and/or ribs may be unidirectional. Slits and/or ribs may be bidirectional on magnet array 344 such as, for example, in a chevron pattern.

Still referring to FIG. 3, an end of Driveshaft 216 may be attached to a propulsor 204. In an embodiment, Propulsor 108 may include at least a propulsor blade 308. At least a propulsor blade 308 may include a plurality of propulsor blades. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as Propulsor 108. In an embodiment, when a propulsor twists and pulls air behind it, it will, at the same time, push the aircraft forward with an equal amount of force. The more air pulled behind the aircraft, the more the aircraft is pushed forward. Thrust element may include a helicopter rotor incorporated into Propulsor 108. A helicopter rotor, as used herein, may include one or more blade or wing elements driven in a rotary motion to drive fluid medium in a direction axial to the rotation of the blade or wing element. Its rotation is due to the interaction between the windings 320 and magnetic fields which produces a torque around the rotor's axis. A helicopter rotor may include a plurality of blade or wing elements. Additional disclosure related to motor windings can be found in U.S. patent application Ser. No. 17/154,578, filed on Jan. 1, 2021, and entitled "METHODS AND SYSTEMS FOR A STATOR WITH HELICAL WINDINGS CONFIGURED FOR USE IN ELECTRIC AIRCRAFT MOTOR," the entirety of which is incorporated herein by reference.

Figure 4:
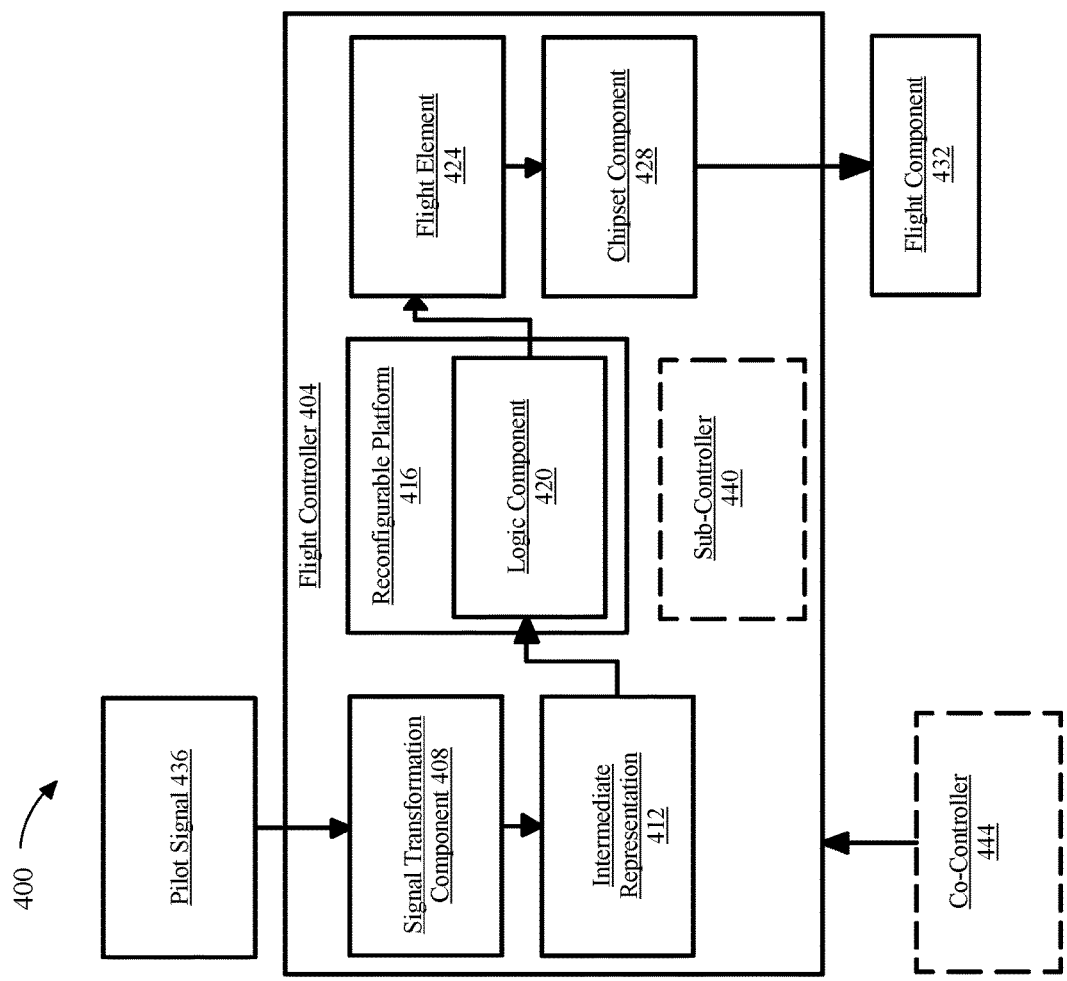
FIG. 4 is a block diagram of an exemplary flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 422. As used in this disclosure a "flight component" is a portion of an aircraft that can be moved or adjusted to affect one or more flight elements. For example, flight component 422 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
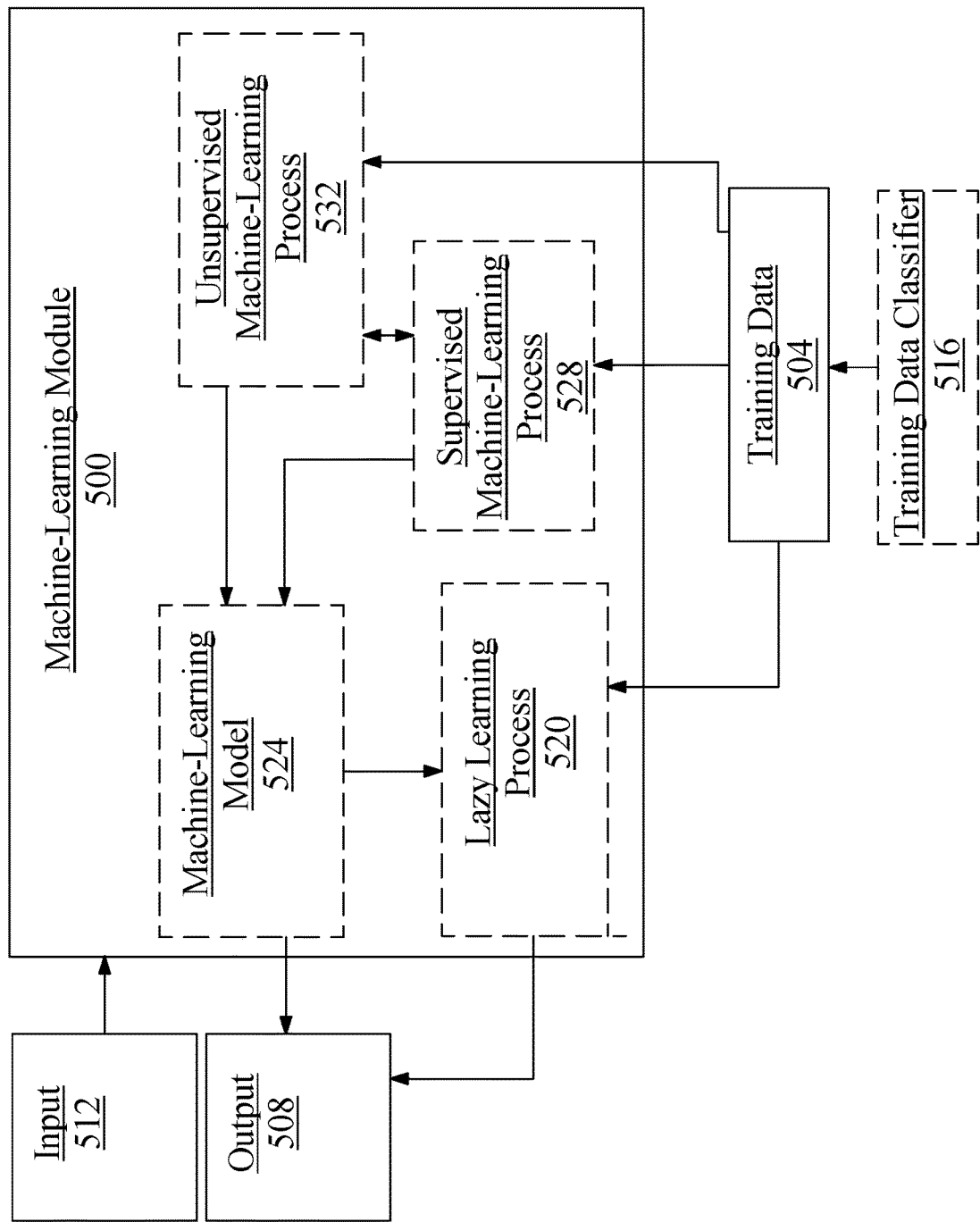
FIG. 5 is a block diagram of an exemplary machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 505 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1616 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
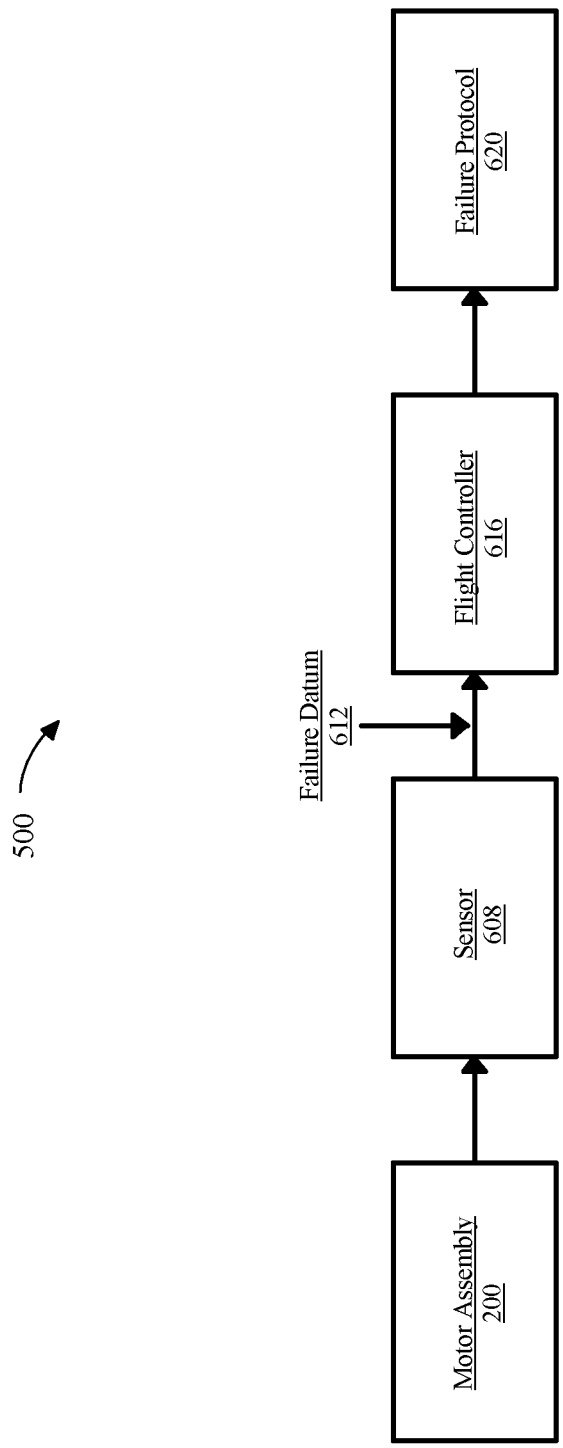
FIG. 6 is a block diagram of failure protocol.

Referring now to FIG. 6, an exemplary block diagram illustrating a process for implementing failure protocol 620. Process 600 includes at least at least a sensor 604 may be configured to detect failure datum 604 from motor assembly 200. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. In one or more embodiments, and without limitation, sensor 604 may include a plurality of sensors. In one or more embodiments, and without limitation, sensor 604 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 604 may be a contact or a non-contact sensor. In one or more embodiments, sensor 604 may transmit/receive signals to/from a flight controller 616. Signals may include electrical, electromagnetic, visual, audio, radio waves, or another undisclosed signal type alone or in combination.

With continued reference to FIG. 6, at least a sensor may include one or more sensors and may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. For example, and without limitation, sensor 604 may detect and/or measure a failure datum 612, such as a temperature, of motor assembly 200

With continued reference to FIG. 6, a sensor 604 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within a sensor 604, may be measured in Fahrenheit (° F.), Celsius (° C.), Kelvin (° K), or another scale alone or in combination. A temperature measured by sensors may comprise electrical signals which are transmitted to their appropriate destination wireless or through a wired connection.

With continued reference to FIG. 6, a sensor 604 may include a sensor configured to detect a Failure datum 612. "Failure datum," for the purposes of this disclosure, refers to a condition of the first motor of the plurality of motors, which causes the failure datum to be outside a predetermined range. Failure datum 612 may include a failure and/or critical operating condition of a motor and/or components thereof that may be harmful to the motor and/or the electric aircraft as a whole. In one or more embodiments, a failure datum 612 may include an overcurrent, undercurrent, overvoltage, overheating, high moisture levels, obstruction withing the rotor, mechanical failure, and the like. Failure datum 612 is data regarding any event that leaves a motor inoperable for its designed function, namely providing lift/thrust to an electric aircraft.

Still referring to FIG. 6, an exemplary embodiment of aircraft 100 is illustrated. System includes a flight controller 616. Flight controller 616 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Flight controller 616 may include a single computing device operating independently, or may include two or more computing device operating in concert, in parallel, sequentially or the like; two or more computing devices may be included together in a single computing device or in two or more computing devices. Flight controller 616 may interface or communicate with one or more additional devices as described below in further detail via a network interface device. Network interface device may be utilized for connecting flight controller 616 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 616 may include but is not limited to, for example, a computing device or cluster of computing devices in a first location and a second computing device or cluster of computing devices in a second location. flight controller 616 may include one or more computing devices dedicated to data storage, security, distribution of traffic for load balancing, and the like. Flight controller 616 may distribute one or more computing tasks as described below across a plurality of computing devices of computing device, which may operate in parallel, in series, redundantly, or in any other manner used for distribution of tasks or memory between computing devices. flight controller 616 may be implemented using a "shared nothing" architecture in which data is cached at the worker, in an embodiment, this may enable scalability of system 100 and/or computing device.

With continued reference to FIG. 6, flight controller 616 may be designed and/or configured to perform any method, method step, or sequence of method steps in any embodiment described in this disclosure, in any order and with any degree of repetition. For instance, flight controller 616 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 616 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 6, flight controller 616 may be configured to enact failure protocol 620 as a function of failure datum 612. As used in the current disclosure, "Failure protocol 620" is a process wherein the flight controller determines that the first motor has failed as a function of failure datum. In embodiments, failure protocol 620 may entail disengaging the first motor of the plurality of motors my severing the electrical connection from the inverter to the stator. Once the first motor is electrically disconnected the second motor of the plurality of motors will then be engaged the motor to thus allowing the continuation of the flight. In some embodiments, the use of freewheel clutches may allow for more seamless transition between the first motor and the second motor because freewheel clutches will allow the drive shaft to continue to rotate while the first motor is disengaged, and the second motor is actively engaged. Flight controller may be configured to disengage the freewheel clutch of the first motor when failure protocol is in progress. Subsequently, the flight controller will engage the freewheel clutch of the second motor to allow the continuation of flight. Flight controller may make a determination that the first motor has failed any time wherein the first motor is inoperable, or its capacity is significantly reduced. Once a determination has been made that the first motor has failed, the flight controller may send a notification to the pilot indicating this failure. The notification may be sent through auditory or visual means. The notification may be displayed within a pilot interface. A pilot interface may be a display used by the pilot to view and track various information regarding the electric aircraft. The information may include engine failure, altitude, speed, location, wind and weather data, battery status, battery health consideration, and the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
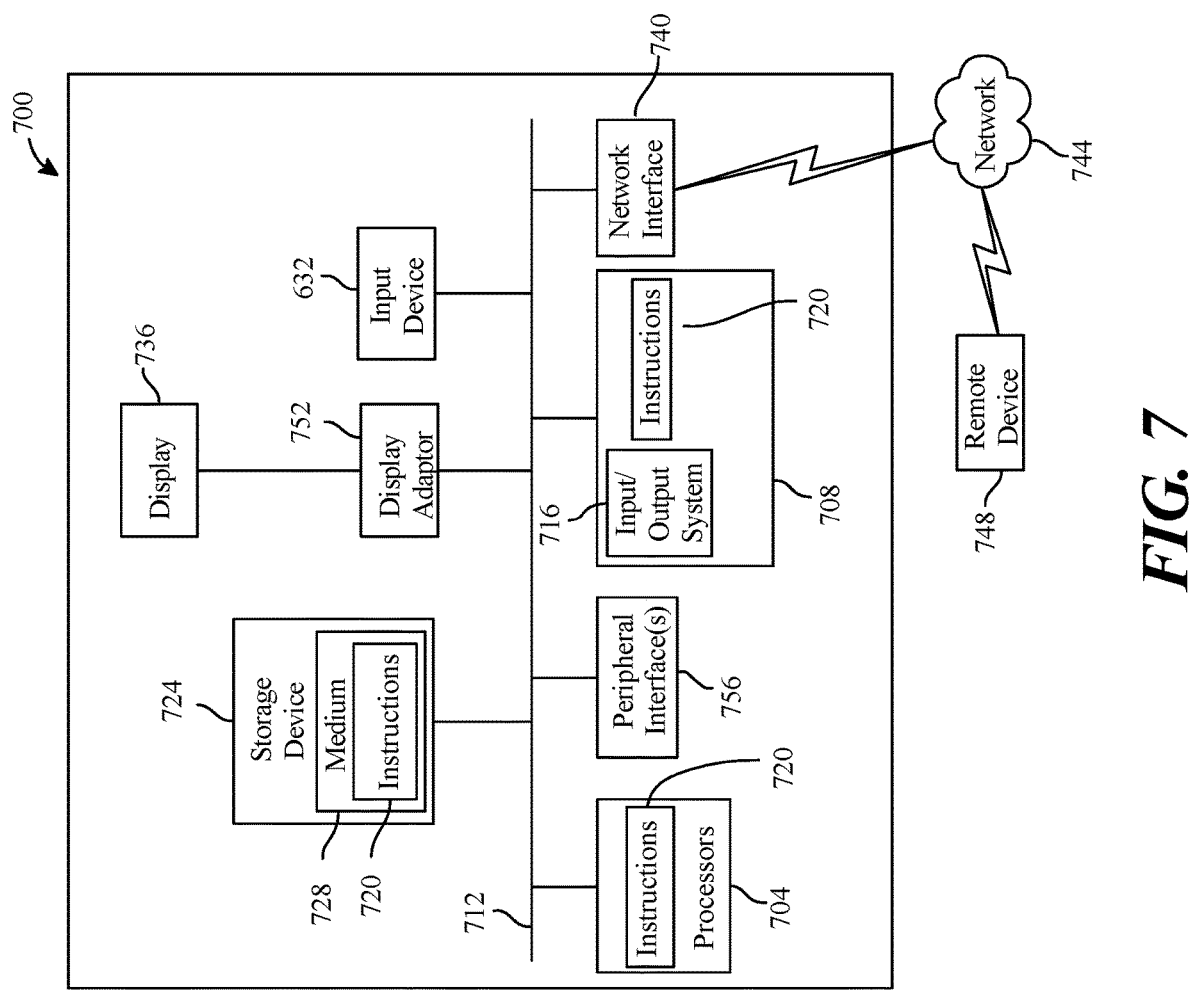
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A propulsor assembly powered by a dual motor system, wherein the propulsor assembly comprises:
    a propulsor;
    a driveshaft that is mechanically coupled to the propulsor, wherein the driveshaft is configured to provide mechanical power to the propulsor;
    a plurality of electric motors configured to impart rotational energy to the driveshaft, wherein the plurality of electric motors comprises at least a first electric motor and at least a second electric motor, wherein:
        each electric motor includes a stator and a rotor; and
        each electric motor is selectively engaged to the driveshaft by a freewheel clutch; and
    a flight controller in electronic communication with the plurality of electric motors, wherein the flight controller is configured to:
        receive a failure datum from at least a sensor communicatively connected to the plurality of electric motors, wherein failure datum comprises an electrical failure of at least one motor of the plurality of motors; and
        engage a failure protocol as a function of the failure datum, wherein the failure protocol comprises disengaging a freewheel clutch of a first electric motor of the plurality of electric motors and engaging a freewheel clutch of a second electric motor of the plurality of electric motors.

2. The assembly of claim 1, further comprising at least an inverter.

3. The assembly of claim 2, wherein each inverter of the at least an inverter is electrically connected to each stator of the plurality of motors.

4. The assembly of claim 1, wherein the flight controller is configured to detect a failure of the first motor of the plurality of motors and to electrically disconnect the inverter from the stator of the first motor.

5. The assembly of claim 4, wherein the flight controller is configured to disengage the freewheel clutch of the first motor while engaging the freewheel clutch of the second motor as a function of the failure datum.

6. The assembly of claim 1, wherein the freewheel clutch is comprised of a sprag clutch.

7. The assembly of claim 1, wherein the freewheel clutch is configured to rotate in only one direction.

8. The assembly of claim 1, wherein the stator is affixed to an aircraft.

9. The assembly of claim 1, further comprising a recess, wherein a recess:
    includes stator is affixed within the recess; and
    comprises a mating flange.

10. The assembly of claim 1, wherein the stator comprises a first magnetic element configured to generate a first magnetic field.

11. The assembly of claim 10, wherein the propulsor comprises:
    a hub; and
    a second magnetic element affixed to the hub, the second magnetic element configured to generate a second magnetic field.

12. The assembly of claim 1, wherein the at least a second magnetic element further comprises at least a permanent magnet.

13. The assembly of claim 1, a flight controller is configured to transmit a display to a pilot indicating that failure occurred.

14. The assembly of claim 1, a motor nacelle surrounds the at least an electric motor.

15. The assembly of claim 1, further comprising:
    an aircraft fuselage; and
    a boom, wherein:
        the boom is connected to the aircraft fuselage;
        the boom extends perpendicularly from the aircraft fuselage; and
        the electric motor and the motor nacelle are connected to the boom.

16. The assembly of claim 15, wherein a fixed wing is attached to the fuselage.

17. The assembly of claim 1, wherein the plurality of lift propulsors are attached to a boom.

18. The assembly of claim 1, wherein rotary encoders are used to determine rotation of drive shaft.

19. The assembly of claim 1, wherein the electrical failure comprises at least one motor of the plurality of motors experiencing an overvoltage.

20. The assembly of claim 1, wherein the electrical failure comprises at least one motor of the plurality of motors experiencing an overcurrent.

* * * * *